L. LEVY.
MACHINE FOR MOLDING CHOCOLATE AND SIMILAR PRODUCTS.
APPLICATION FILED DEC. 30, 1919.

1,425,395. Patented Aug. 8, 1922.

Inventor
L. Levy,
By H. R. Kerslake
Attorney

UNITED STATES PATENT OFFICE.

LOUIS LEVY, OF PARIS, FRANCE.

MACHINE FOR MOLDING CHOCOLATE AND SIMILAR PRODUCTS.

1,425,395.　　　　Specification of Letters Patent.　　Patented Aug. 8, 1922.

Application filed December 30, 1919. Serial No. 348,398.

*To all whom it may concern:*

Be it known that I, LOUIS LEVY, citizen of the Republic of France, residing at Paris, Seine, 92 Boulevard Richard Lenoir, have invented certain new and useful Improvements in Machines for Molding Chocolate and Similar Products, of which the following is a specification.

Jolting machines hitherto in use in chocolate factories consist mainly of a table on which the filled moulds are arranged and which, mounted on a suitable mechanism, is subjected to a series of successive jolts of equal intensity, the violence of which can be predetermined.

Now for settling the chocolate, the violence of the jolts is limited, as the moulds jerked into the air would fall on one another and would assume inclined positions, which would impart an incurved shape to the chocolate or would cause inequality of thickness or other irregularity of shape. Violent shocks are however necessary in order properly to compress the chocolate.

If the method be examined, by which an operative settles the chocolates in the moulds, when no jolting machine is available, it will be seen that he acts in the following manner: He first violently throws the board with the moulds filled with chocolate to be levelled on to a marble slab, and then gives with this board a series of small blows on the marble, after which he lifts the board anew in a manner to throw it again forcibly on to the marble, this new shock being followed again by a series of small blows, and so on until settling has been completed.

The operative's method of acting is perfect in the sense that a large blow at the commencement is necessary to stiff pastes, and that this single violent blow, followed by small blows does not cause displacement of the moulds and their straddling, from whence irregularities of the tables arise.

It is therefore desirable to imitate mechanically in a jolting machine, the manual work of the operative, which is the object of the present invention.

On the accompanying drawing:—

Figure 3:
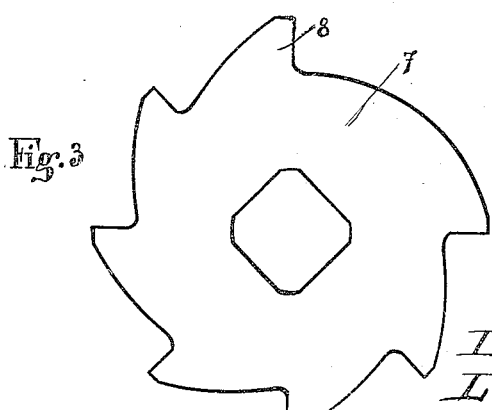
Fig. 3 is an elevation of the face of a cam.

The jolting machine can be of any suitable design. It consists, as hitherto, of a frame 1, secured by its base 2 to the floor of the workshop. This frame has an arm 3, through which extends the driving spindle 4, one end of which is provided with a fast pulley 5 and a loose pulley 6, whilst the other is provided with a cam consisting of a ratchet wheel 7, one tooth 8 of which protrudes more than the others, as shown in Fig. 3.

In the upper portion of the frame is arranged a vertical spindle 9, ending in a nose 10 of harder metal, which rides on the teeth of the wheel 7. This spindle is guided by a feather 11, which slides in a slotway 12, provided in the frame.

Figure 1:
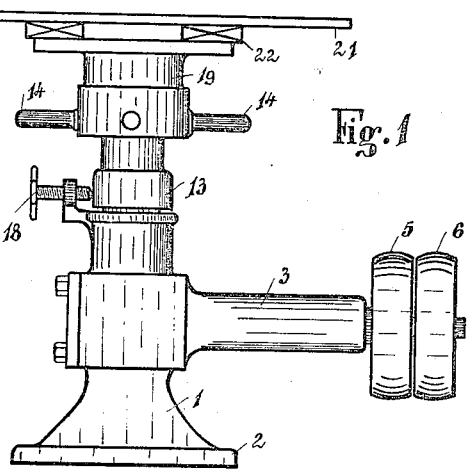
Fig. 1 is an elevation of the machine.
Figure 2:
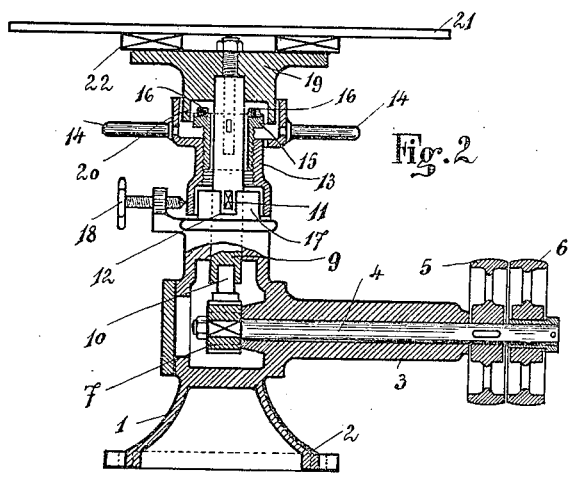
Fig. 2 is a vertical section.

Surrounding the spindle 9 is a sleeve 13, provided with handles 14 which facilitate its being turned, and inside which sleeve is screwed a bush 15. This bush can be screwed to protrude more or less, in accordance with the work to be effected, and it is provided with rubber pads 16, serving to deaden the shocks when the table fitting comes into contact therewith. The member 15 is keyed against rotation on the spindle 9 through the medium of a key 15$^a$ carried by the member engaging a slot in the spindle, as clearly shown in Fig. 2. The sleeve 13 is held against vertical movement by its weight.

The sleeve 13 is situated on the portion 17 of the frame, and it is secured in a predetermined position by a screw 18.

The spindle 9 is provided at its upper end with a head 19, the lower portion of which enters the sleeve 13.

On this head is placed, on interposed transverse members 22, the table 21.

The action of the machine is as follows:—The pulley 5 rotates the spindle 4 and accordingly the ratchet wheel 7 also. The teeth of the ratchet wheel cause the nose to jump from one tooth to another, imparting to the spindle 9 a series of small shocks, then, when the tooth 8 comes to raise the nose 10, it imparts a more violent shock to the spindle by virtue of its greater protrusion.

This machine thus imitates the action of the operative, which consists in giving a large shock and then a series of small shocks.

The constructional embodiment of the invention can be varied in its details.

Having now particularly described and ascertained the nature of my said invention and in what manner the same is to be performed, I declare that what I claim is:—

1. In a chocolate jolting machine, the combination of a frame, a shaft mounted in the frame, a disk mounted on the shaft, said disk having on its edge a plurality of cams, one of which terminates a greater distance from the center of the disk than the other of said cams, a table located above the frame, and a stem depending below the frame and terminating in the path of movement of the cams, whereby when the disk is rotated, a series of minor vertical jarring movements and a violent jarring movement will be imparted to the table in each revolution of the shaft.

2. In a chocolate jolting machine, the combination of a frame, a table mounted above the frame, a support for the table, a shaft, and means between the support and shaft for imparting to the table and support successive minor vertical jarring movements and a violent jarring movement in each revolution of the shaft.

3. In a chocolate jolting machine, the combination of a frame formed with slots, a rotatable member supported on the frame and provided with a buffer, a threaded bushing in the rotatable member, a stem extending through the bushing, a member extending from the stem and fitting in the slots in the frame, a support on the stem, said support adapted to rest on the buffer when the stem is in one position to relieve the shock, a table on the support, and means for imparting a successive series of minor jarring movements and a violent jarring movement to the stem.

4. In a chocolate jolting machine, the combination of a shaft, a disk on the shaft provided with a series of minor cams and a major cam, the space between the major cam and the next succeeding minor cam being greater than the spaces between the series of minor cams, a table, and a stem between the table and the cams, whereby when the disk is rotated a series of minor jarring movements and a violent jarring movement will be imparted to the table, the interval between the violent jarring movement and the next minor jarring movement being greater than the intervals between the minor jarring movements.

5. In a chocolate jolting machine, the combination of a frame, a table mounted above the frame, a support for the table, a spindle slidable in the frame and connected to the support, means for imparting successive minor vertical jarring movements to the spindle and a violent vertical jarring movement to the spindle during each revolution of a driving means, means for deadening the shocks of the table movement in one direction, and a member for adjusting said means vertically to vary its relation with respect to the table.

In testimony whereof I affix my signature in presence of a witness.

LOUIS LEVY.

Witness:
  CHAS. P. PRESSLY.